(12) United States Patent
Berger

(10) Patent No.: US 6,334,459 B1
(45) Date of Patent: Jan. 1, 2002

(54) MULTI-FUCTIONAL BRAKE BLEEDER TOOL

(76) Inventor: Leon Berger, 7830 Oak Hill Rd. #456-3, Oak Hills, CA (US) 92345

(*) Notice: Subject to any disclaimer, the term of this patent is extended or adjusted under 35 U.S.C. 154(b) by 0 days.

(21) Appl. No.: 09/621,936

(22) Filed: Jul. 24, 2000

Related U.S. Application Data

(60) Provisional application No. 60/148,247, filed on Aug. 11, 1999.

(51) Int. Cl.[7] ................................................ G05D 7/01
(52) U.S. Cl. ........................ 137/198; 137/199; 188/352
(58) Field of Search ................................ 137/198, 199; 188/352

(56) References Cited

U.S. PATENT DOCUMENTS

| | | | |
|---|---|---|---|
| 2,729,228 A | * 1/1956 | Stevenson | 137/199 |
| 4,149,560 A | 4/1979 | Berg | 137/543.21 |
| 4,804,017 A | 2/1989 | Knapp | 137/614.16 |
| 4,865,171 A | 9/1989 | Miller | 188/352 |
| 4,979,541 A | 12/1990 | Holland | 137/540 |
| 4,989,639 A | 2/1991 | Sulwar | 137/614.17 |

* cited by examiner

Primary Examiner—Gerald A. Michalsky

(57) ABSTRACT

A brake bleeding tool having a positive locking device, one for each, of the standard and the recessed bleeder valves of vehicle braking systems. These tools have a nut driver configuration on the proximal end allowing the mechanic to open and close the valves in a hand tight manner. The tools other than the locking configurations operate exactly the same. A biased discriminator pin allows air to be expelled from the system by the mechanic pumping the brake pedal, however when the brake fluid reaches the discriminator pin it is detained allowing the brake pedal to reach a full top position. If the mechanic feels that there is still some air in the system, then by added pressure on the brake pedal to overcome the adjustably biased discriminator pin air and brake fluid will be discharged through the tool, a fitting and hose at the distal end directs the brake fluid into a container. By using one of these tools on each brake cylinder being bled, any number of cylinders can be bled at the same time. With all the bleeder valves open and master cylinder full, continuous pumping of the brake pedal will expel the air until the brake fluid reaches each discriminator valve. Since the discriminator valve will not pass brake fluid the pressure is directed to the other cylinders until all the air has been expelled. There should be a full pedal at this time, however if the mechanic feels that some air still exists in the system, closing hand tight all but one bleeder valve, pressing the brake pedal to the floor will expel the last air bubble from this cylinder. Repeating the operation for each of the other cylinders will complete the job.

4 Claims, 3 Drawing Sheets

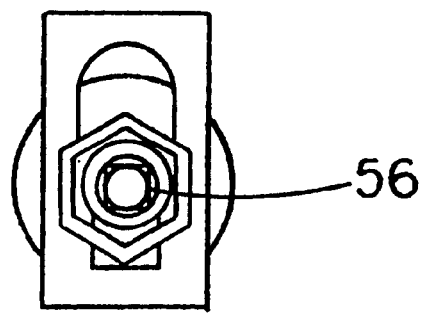
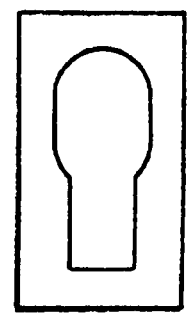
FIG 4     FIG 5
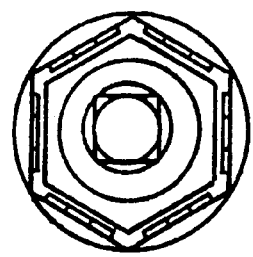
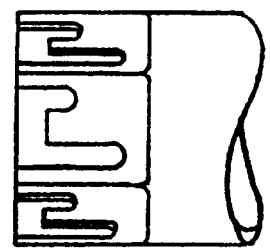
FIG 6     FIG 7

MULTI-FUCTIONAL BRAKE BLEEDER TOOL

This application claims the benefit of provisional application Ser. No. 60/148,247, filed Aug. 11, 1999.

The present invention is directed to a brake bleeding device, particularly to a device of simple construction that can be manufactured at reasonable cost, can be installed or removed from a vehicle within a fraction of a second, can bleed one or more brake cylinders at the same time and produce a full brake pedal without the mechanic stepping out of the car.

BACKGROUND OF THE RELATED ART

The introduction of hydraulic brakes has generated a need for a tool that will enable an individual to bleed the brakes on a automobile, truck, light airplane, and other hydraulic systems, effectively and quickly without help from a second party. The need for this tool is exemplified by the number of patents on brake bleeding devices.

The use of a biased check valve allows a massive amount of brake fluid to be expelled from the system, yet gives no indication to the person working the brake pedal as to when the job is completed.

The master cylinder is a very efficient pump and does not create a negative pressure when the brake pedal is released, but rather a zero pressure, therefore there is no need for a ball or needle check valve to prevent the back-flow of air or fluid.

The U.S. Patent and Trademark office has issued many patents on brake bleeding tools. These tools range from pressure vessels to vacuum pumps, one way valves replacing the factory bleeder valves and one way valves attached to the factory bleeder valves. Various means are employed to attach these tools to the brake cylinders, all these tools are basically one way check valves, all require monitoring as to when all air has left the system, none tell the mechanic when the job is done, none guarantee results.

The present invention is intended to meet all the requirements necessary to successfully bleed the brake of any vehicle or light aircraft.

Thus for example, U.S. Pat. No. 4,804,017 to Knapp, (1989) Titled Brake bleeder valve apparatus having integral check valve and method for bleeding brakes. Describes a replacement bleeder valve, that through a complex system has achieved a biased ball check valve. The claim that this tool will bleed all four wheel cylinders at the same time is in doubt since there is no way to stop the flow of brake fluid to any of the wheel cylinders, other than going under the vehicle and operating each of them independently. The brake fluid will take the path of least resistance and exit only one cylinder.

U.S. Pat. No. 4,149,560 to Berg (1979) Titled Brake bleeder valve, shows a resilient outer case, the upstream end is molded in a way enabling the tool to be clipped onto the factory bleeder valve, this tool contains a metal cylinder, the upstream end having a valve seat and a biased needle valve to control the flow of brake fluid, this tool does exactly the same thing as the Knapp tool..

U.S. Pat. No. 4,479,511 To Holland (1984) Titled One man brake check valve and coupler assembly. Shows a "U" shaped collar machined into a threaded bushing that is placed behind the frustum of the factory bleeder valve, a check valve assembly is screwed into it seating the valve assembly securely against the frustum of the factory bleeder valve, this requires the use of two wrenches in awkward places, yet does exactly the same thing as Knapp and Berg.

U.S. Pat. No. 4,989,639 To Sulwar (1991) Titled Brake bleeder check valve, Shows a standard brake bleeder valve with a built in check valve, it replaces the factory bleeder valve and has no advantage over Knapp, Berg, or Holland.

U.S. Pat. No. 4,865,171 To Miller (1989) Titled Brake bleeder valve, shows a rubber or plastic duck bill valve, which slips over the end of the factory bleeder valve, has no moving parts, and does exactly the same thing as Knapp, Berg, Holland or Sulwar.

Thus, although there is considerable prior art relating to brake bleeding tools, none are considered more relevant to the present invention than the art discussed above.

SUMMARY

In accordance with the present invention a brake bleeding tool consists of a handle, a tubular extension designed to engage the factory bleeder valve of a hydraulic braking system, to be able to discriminate between air and brake fluid allowing the mechanic to know when the air is gone and when necessary discharge an amount of brake fluid under pressure, thereby duplicating the two man brake bleeding system.

OBJECTS OF THE INVENTION

A principal object of the present invention is to provide a positive means whereby one person can effectively bleed the brakes of a vehicle or aircraft.

A related object of this invention is to have the tool instantly engage or disengage the factory bleeder valve of the braking system.

Another object of this invention is to have a means to inform the mechanic when their is no more air in the braking system. According to yet another aspect of this invention to provide a means to open and close the brake bleeder valve.

According yet to another aspect of this invention a means to adjust the bias on the discriminator pin.

According yet to another aspect of this invention to provide a means to direct excess brake fluid into a container.

These and other related objects are realized by providing in a preferred embodiment of this invention a truly professional brake bleeding device.

BRIEF DESCRIPTION OF THE DRAWINGS

FIG. 4 Is a proximal end view of the tool with the shuttle member.

FIG. 5 Is a view of the shuttle member showing keyhole design

FIG. 6 Is a proximal end view of the tool adapted for cylinders with recessed bleeder valves.

FIG. 7 shows the j slot detail used where the bleeder valve is recessed.

It is to be noted that the appended drawings illustrate only preferred embodiments of this invention and are therefore not to be considered limiting of its scope, for this invention may admit to other equally effective embodiments.

NUMERALS IN DRAWINGS

Figure 3:
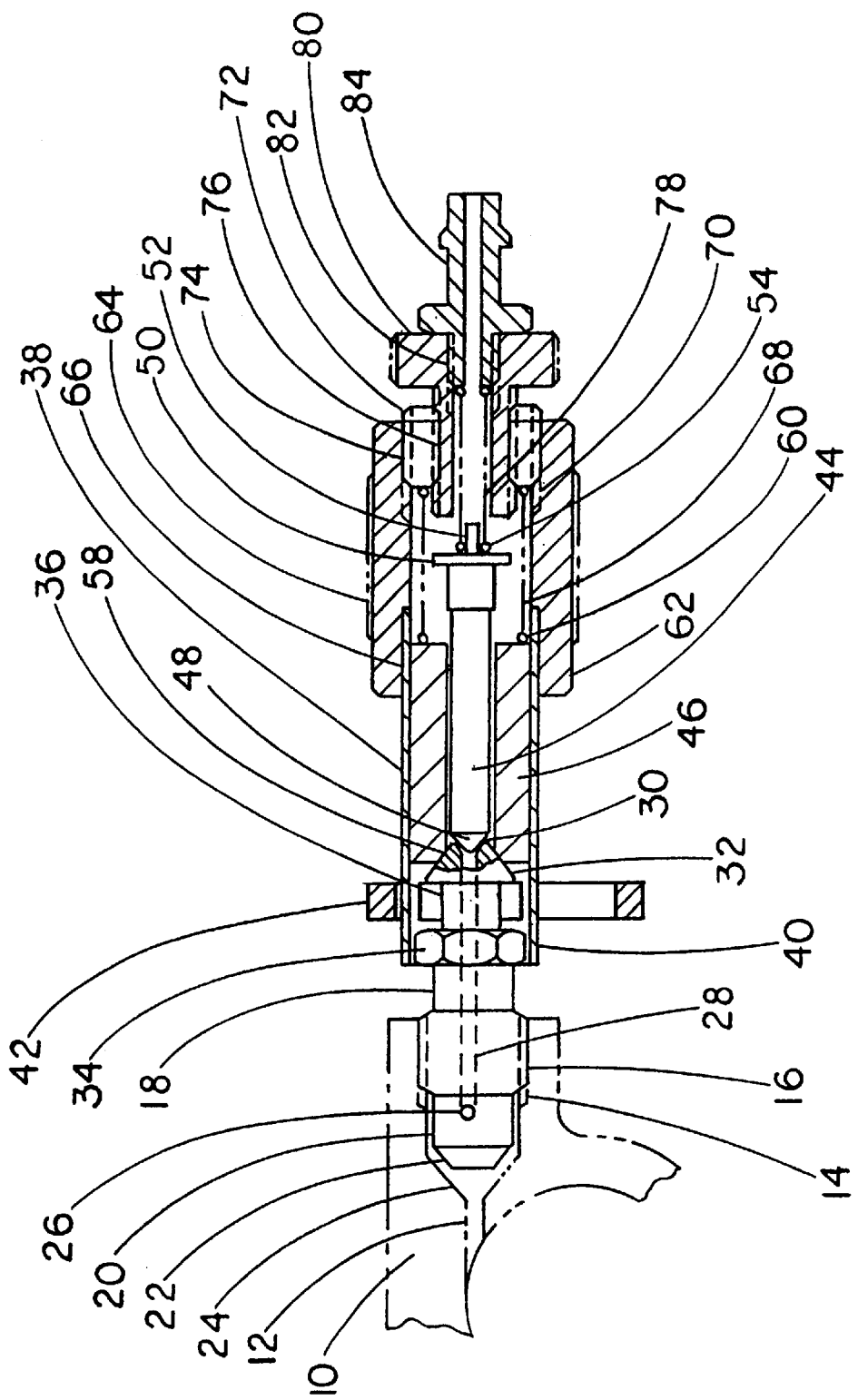
FIG. 3 Is a cross sectional view of FIG. 1

| | |
|---|---|
| 10 portion of wheel cylinder | 48 chamfered end on 44 |
| 12 bleeder hole of 10 | 50 flange on 44 |
| 14 internal thread of 10 | 52 pin for bias member 54 |
| 16 external thread of 18 | 54 bias for pin 44 |
| 18 bleeder valve | 56 disturbed surface on 44 (on FIG. 4) |
| 20 reduced end of 18 | 58 sealing detail on 46 |
| 22 bevel of 18 | 60 bias for seal 46 |
| 24 valve seat of 12 | 62 tool body |
| 26 transverse hole of 20 | 64 knurl to assist grip on 62 |
| 28 longitudinal bore of 18 | 66 first bore for 38 |
| 30 distal end of 18 | 68 bore matching inside dia. of 38 |
| 32 circumference of frustum | 70 thread to accept 72 |
| 34 wrench portion of 18 | 72 bushing |
| 36 nipple area of 18 | 74 outside thread on 72 |
| 38 steel tube of FIG. 3 | 76 inside thread on 72 |
| 40 formed end of 38 | 78 bore in 80 |
| 42 locking device on 38 | 80 adjusting screw |
| 44 discriminator pin | 82 thread for fitting |
| 46 seal | 84 fitting for brake fluid |

DESCRIPTION OF PREFERRED EMBODIMENTS

Figure 1:
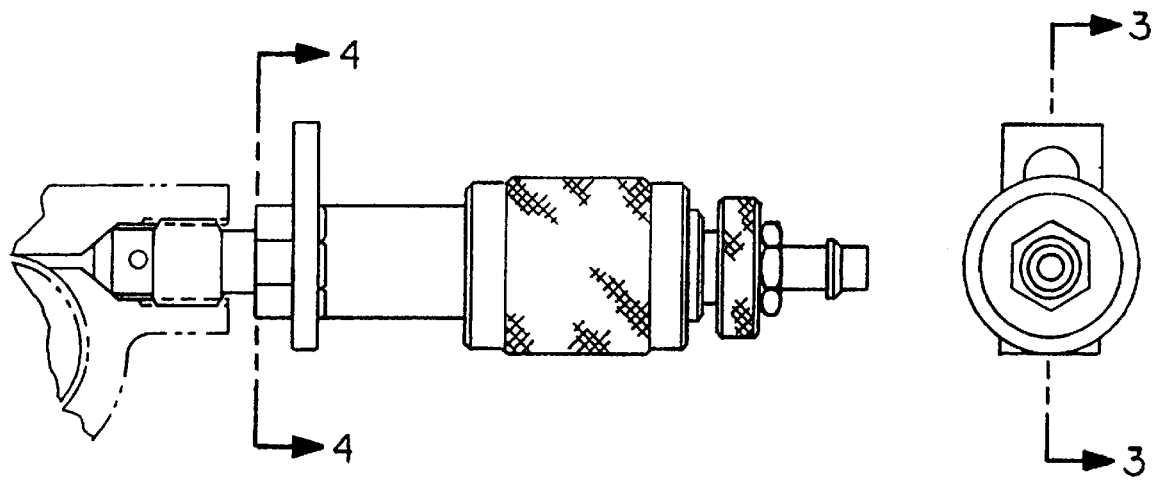
FIG. 1 Is a side elevation of a exemplary brake bleeding tool, installed on a wheel cylinder.
Figure 2:
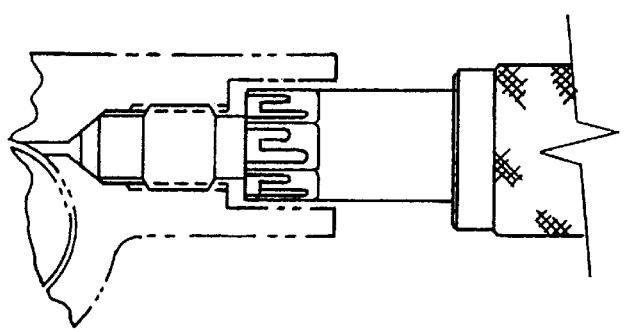
FIG. 2 is a side elevation of a exemplary brake bleeding tool, as shown where the bleeder valve is recessed in the brake cylinder housing.

A preferred embodiment of the brake bleeding tool of this invention is illustrated in FIG. 1 and FIG. 2. The cross sectional view of FIG. 1 is shown in FIG. 3

Turning now to a consideration of the drawings, and in particular to the cross sectional view of FIG. 3 shows a portion of a wheel cylinder 10 that is furnished with a bleeder hole 12 that terminates into a internally threaded opening 14 for receiving an external threaded end 16 of a standard bleeder valve 18. This bleeder valve 18 has a reduced end 20 that is furnished with a bevel 22 that is adapted to mate with the valve seat 24 that is part of the bleeder hole 12 of the brake cylinder 10. The reduced end 20 is also furnished with a transverse opening 26 which communicates with a longitudinal bore hole 28 that extends to the distal end 30 of the bleeder valve 18. At an intermediate position is a wrenching area 34 a short nipple area 36 and a frustum shaped end 32.

What has been described above is the standard bleeder valve that is supplied on most vehicles and light aircraft. To bleed the brakes it is necessary to have one person under the car to open and close the bleeder valve on demand and the other in the drivers seat operating the brake pedal, and directing the person under the car as to when to open and when to close the brake bleeder valve. Thus the building up and the release of pressure allows air and brake fluid to escape. This operation may be repeated several times depending on the severity of the repair. It must also be realized that there must be a constant refilling of the master cylinder. This, although the best way to bleed a brake system it is quite costly. Referring to FIG. 3 A steel tube 38 having the proximal end 40 formed to accept the wrenching portion 34 of the bleeder valve 18 a locking device 42 fitted slidingly in steel tube 38 so as to drop by gravity over the nipple area 36 and behind frustum shaped end 32 thereby locking tool into place.

A discriminator pin 44 fitted slidingly within seal 46 having a chamfer 48 at the proximal end, the distal end having a nail like flange 50 and a pin 52 to retain in position the biasing agent 54 a disturbed circumference 56 (FIG. 3) to allow brake fluid to escape past the discriminator pin 44.

A seal 46 having a detail 58 to fit sealingly to frustum 32 of bleeder valve 18 fitted slidingly within the steel tube 38 and biased by helical spring 60.

A handle 62 having a knurled gripping area 64 having a first bore 66 to accept steel tube 38 a bore 68 to continue inside diameter of steel tube 38 a threaded area 70 to accept bushing 72.

A bushing 72 having a external thread 74 meshing with internal thread 70 of handle 62 and a internal thread 76 to accept discriminator pin adjusting screw 80.

An adjusting screw 80 having a bore 78 positioning discriminator biasing agent and allowing passage of brake fluid through, having a knurled knob and an internal thread 82 to accept pressure fitting 84.

The brake fluid leaving the master cylinder and on the way to the wheel cylinders or calipers, encounter many twists and turns, one or more of these turns are most likely in a position to trap air. Since air is lighter than brake fluid, the brake fluid passes under the air bubble, thereby holding it in place, this occurs when a massive amount of brake fluid passed through the line at little or no pressure.

The two person brake bleeding system has been recognized as the best and surest way to bleed brakes, where one person remains in the car pumping the brake pedal, while the other is under the vehicle operating the brake bleeder valve on demand.

Operation of the Tool

The instant invention allows the brake fluid to advance with light pressure on the brake pedal thereby keeping the air ahead of the brake fluid, the air is expelled at the discriminator pin. When the brake fluid reaches the discriminator pin it meets with a resistance resulting in a full brake pedal. The person working the brake pedal can readily tell if there is still air in the system by feeling an amount of sponginess in the brake pedal, adding extra pressure to the brake pedal overcomes the bias of the discriminator pin, allowing an amount of air and brake fluid to escape under pressure thereby duplicating the two person bleeding system.

Conclusion

Accordingly, it is obvious that the use of pressure vessels, vacuum pumps, and one way check valves are time consuming, use an excessive amount of brake fluid and are only partially effective. The two person brake bleeding system, although time and labor intensive uses a substantial amount of brake fluid but does a excellent job.

To use this tool it is only necessary for the mechanic to open the bleeder valve as is normally done, close hand tight, press tool onto bleeder valve, instantly locking on valve, using tool open slightly, fill master cylinder on way to the brake pedal, press brake pedal several times till the pedal reaches the top position, if slightly spongy, press brake pedal to floor board (this will take a little more pressure) release pedal, make sure it is solid, use tool to close bleeder valve hand tight, remove tool and cinch up fitting. All done !. The entire job of bleeding a wheel cylinder has now been accomplished by one person within a few minutes and with a substantial savings of time and of course, money.

What is claimed is:

1. A demountable brake bleeding tool adapted to the direct locking engagement with a brake bleeder valve, said brake bleeder valve having a elongated body, an externally threaded center portion, the distal end portion having an unthreaded reduced diameter terminating in a sealing configuration, the proximal end extends outside a wheel cylinder body and having a hexagonal portion as a wrenching area, in succession toward said proximal end a nipple area and a frustum configuration, a longitudinal bore extending from said proximal end therethrough to engage a transverse smaller bore in said unthreaded section;

a. said demountable brake bleeding tool having an upstream end and a downstream end, where said upstream end portion is a metal tube, said metal tube having one of a first configuration and a second configuration, wherein in the first configuration the upstream end is formed to accept said wrenching area and having parallel slots placed rearward and adjacent to said formed upstream end, said parallel slots sized to slidingly accept a shuttle member, said shuttle member having a keyhole configuration therethrough, said keyhole configuration having an annular portion sized to pass over said frustum, the rectangular portion of said keyhole sized to fit over said nipple and behind said frustum thereby locking said demountable brake bleeding tool to said brake bleeder valve, a cylinder of suitable material having a precision sliding fit within said metal tube and having a cross section sporting a bore therethrough, said cylinder having a configuration at the distal end of said bore to sealingly engage said frustum, said cylinder being urged to a sealing position to said frustum by a predetermined bias, a discriminator pin having a first diameter sized to fit slidingly within said cylinder, said discriminator pin having a second diameter at the proximal end to retain said discriminator pin within said cylinder, said discriminator pin configured to engage the proximal end of said longitudinal bore of said bleeder valve being urged into place by an adjustable or fixed bias, b. said demountable brake bleeding tool having a tool body, said tool body consisting of any suitable material having a predetermined length, said tool body having an outer diameter sized and configured to provide a gripping area, a bore therethrough, the distal end sized to receive said metal tube, the proximal end having a first internal thread, a threaded bushing having an external thread and a second internal thread, said bushing when screwed into said first internal thread activates said cylinder bias, an adjusting screw configured to mate with said second internal thread and having sufficient length to provide an adjustment range, said adjusting screw having an axial bore therthrough and a knurled knob at the proximal end, said axial bore, the distal end portion having a diameter to receive the biasing agent of said discriminator pin, the proximal end having a smaller diameter, said adjusting screw the proximal end having a means to allow hydraulic fluid to pass through a pressure fitting, said pressure fitting being installed into the proximal end of said adjusting screw, said adjusting screw when shortened to a predetermined length will produced a fixed bias for said discriminator pin, c. said metal tube, in the event that the downstream end has a second configuration when said brake bleeder valve is confined within said wheel cylinder body, said metal tube having a second configuration whereby the downstream end is formed to accept said wrenching area of said brake bleeder valve thereby producing a six sided configuration, said six sided configuration having a j form pressed into each side, therefore said shuttle member is not used while all other attributes remain the same.

2. As set forth in claim 1, whereas said metal tube, the downstream end formed to receive said wrenching area; where a. said formed end having parallel slots placed rearward and adjacent to said formed end b. said formed slots slidingly accepting said shuttle lock c. said shuttle lock having a keyhole configuration therethrough.

3. As set forth in claim 1, said discriminator pin fitted slidingly within said cylinder, whereas a said discriminator pin having a chamfer at the distal end, said chamfer having a deformed diameter so as to effect an imperfect fit to said longitudinal bore of said brake bleeder valve, b. said discriminator pin having a predetermined length and diameter, said diameter being relieved so as to allow hydraulic fluid to pass c. said discriminator pin having a second diameter at the proximal end so as to retain said discriminator pin within said cylinder.

4. As set forth in claim 1, said metal tube having a second configuration, a. said second configuration where the upstream end is formed to accept said wrenching area of said brake bleeder valve thereby creating a six sided configuration, b. said six sided configuration having a j configuration pressed into each side, c. said j configuration accepting said wrenching area, whereas a slight turn places the six corners of said wrenching area between the short and long legs of said j slots; whereby d. the reciprocal of said cylinder bias holds said demountable brake bleeding tool in an engaged position.

* * * * *